(12) United States Patent
Huang et al.

(10) Patent No.: US 7,593,089 B2
(45) Date of Patent: Sep. 22, 2009

(54) METHOD FOR FABRICATING LIQUID CRYSTAL PANEL

(75) Inventors: Shang-Yu Huang, Miao-Li (TW); Tsau-Hua Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 283 days.

(21) Appl. No.: 11/725,723

(22) Filed: Mar. 19, 2007

(65) Prior Publication Data

US 2007/0216848 A1    Sep. 20, 2007

(30) Foreign Application Priority Data

Mar. 17, 2006   (TW) ............................... 95109294 A

(51) Int. Cl.
*G02F 1/1339*    (2006.01)
(52) U.S. Cl. ....................... 349/157; 349/155; 349/156; 349/106
(58) Field of Classification Search .......... 349/155–157
See application file for complete search history.

(56) References Cited

U.S. PATENT DOCUMENTS

| | | | |
|---|---|---|---|
| 5,054,890 A * | 10/1991 | Hanyu et al. ................. | 349/155 |
| 5,142,395 A * | 8/1992 | Yamazaki et al. ............ | 349/157 |
| 5,812,232 A * | 9/1998 | Shiroto et al. ............... | 349/157 |
| 6,067,144 A * | 5/2000 | Murouchi .................... | 349/156 |
| 7,006,193 B2 | 2/2006 | von Gutfeld et al. | |

* cited by examiner

*Primary Examiner*—Richard H Kim
(74) *Attorney, Agent, or Firm*—Wei Te Chung

(57)    ABSTRACT

An exemplary method for fabricating a liquid crystal panel includes: providing a first substrate (210); forming a plurality of color resin layers (212) and a black matrix (27) spacing the color resin layers on the first substrate; forming a plurality of compressible photo spacers (24) on the black matrix, the photo spacers comprising a plurality of photo spacers having a first length and a plurality of photo spacers having a second length different from the first length, wherein the first length and the second length are measured perpendicular to the first substrate; providing a second substrate; coating a sealant along an outer periphery of the second substrate, whereby the second substrate and the sealant cooperatively defining a space; dropping liquid crystal on the second substrate in the space; placing the first substrate onto the second substrate and pressing the first substrate; and curing the sealant.

8 Claims, 6 Drawing Sheets

METHOD FOR FABRICATING LIQUID CRYSTAL PANEL

FIELD OF THE INVENTION

The present invention relates to liquid crystal panels and methods for fabricating liquid crystal panels, and particularly to a liquid crystal panel having photo spacers and a method for fabricating such liquid crystal panel.

GENERAL BACKGROUND

A typical liquid crystal display (LCD) is capable of displaying a clear and sharp image through thousands or even millions of pixels that make up the complete image. The liquid crystal display has thus been applied to various electronic equipment in which messages or pictures need to be displayed, such as mobile phones and notebook computers. A liquid crystal panel is a major component of the LCD, and generally includes two substrates and liquid crystal filled in a space defined between the two substrates.

Methods of filling the liquid crystal in the space include an injection method and a one drop fill (ODF) method. The injection method includes the following steps: coating sealant along an outer periphery of one of the substrates, and defining one or more small gaps in the sealant; placing the other substrate onto the substrate having the sealant, and curing the sealant; immerging the assembly into liquid crystal in a vacuum environment so that the gaps in the sealant receive liquid crystal; and diminishing the vacuum environment such that the liquid crystal is pushed into the space between the two substrates through the gaps by atmospheric pressure. The ODF method includes the following steps: coating sealant along an outer periphery of one of the substrates, thereby defining a rectangular space; dropping liquid crystal on the substrate in the space; placing the other substrate onto the substrate having the sealant and the liquid crystal in a vacuum environment; and curing the sealant.

Referring to FIG. 9, this is a flowchart summarizing a typical method for fabricating a liquid crystal panel. The method includes the following steps.

In step S1, referring also to FIG. 10, a first substrate 110 is provided.

In step S2, a plurality of color resin layers 111 and a black matrix 17 spacing the color resin layers 111 are formed on the first substrate 110. The color resin layers 111 include red resin layers 11, green resin layers 12, and blue resin layers 13.

In step S3, a plurality of photo spacer 14 are formed on the black matrix 17. The photo spacers 14 have a same height. Each photo spacer 14 is disposed between two color resin layers 111 having a same color.

In step S4, a second substrate (not shown) is provided.

In step S5, sealant is coated along an outer periphery of the second substrate, whereby the second substrate and the sealant cooperatively define a space.

In step S6, liquid crystal is dropped on the second substrate in the space.

In step S7, the first substrate 110 having the color resin layers 111, the black matrix 17 and the photo spacers 14 is placed onto the second substrate and is pressed in a vacuum environment.

In step S8, the sealant is cured.

Because the photo spacers 14 have a same height, a total contact area between the photo spacers 14 and the second substrate is large. Therefore when the first substrate 110 is pressed, compression of the photo spacers 14 is limited and the diminution in height of the photo spacers 14 is minimal.

As a result, it is difficult for the liquid crystal to fill the entire space between the two substrates. This means dropping of the liquid crystal must be precisely controlled within a narrow tolerance range. That is, the method for fabricating the liquid crystal panel is problematic, and yields can be low.

What is needed, therefore, is a method for fabricating a liquid crystal panel that can overcome the above-described problems.

SUMMARY

In one preferred embodiment, a method for fabricating a liquid crystal panel includes: providing a first substrate; forming a plurality of color resin layers and a black matrix spacing the color resin layers on the first substrate; forming a plurality of compressible photo spacers on the black matrix, the photo spacers comprising a plurality of photo spacers having a first length and a plurality of photo spacers having a second length different from the first length, wherein the first length and the second length are measured perpendicular to the first substrate; providing a second substrate; coating a sealant along an outer periphery of the second substrate, whereby the second substrate and the sealant cooperatively defining a space; dropping liquid crystal on the second substrate in the space; placing the first substrate onto the second substrate and pressing the first substrate; and curing the sealant.

Other novel features and advantages will become more apparent from the following detailed description when taken in conjunction with the accompanying drawings. In those drawings showing views, all the views are schematic.

DETAILED DESCRIPTION OF PREFERRED EMBODIMENTS

Figure 1:
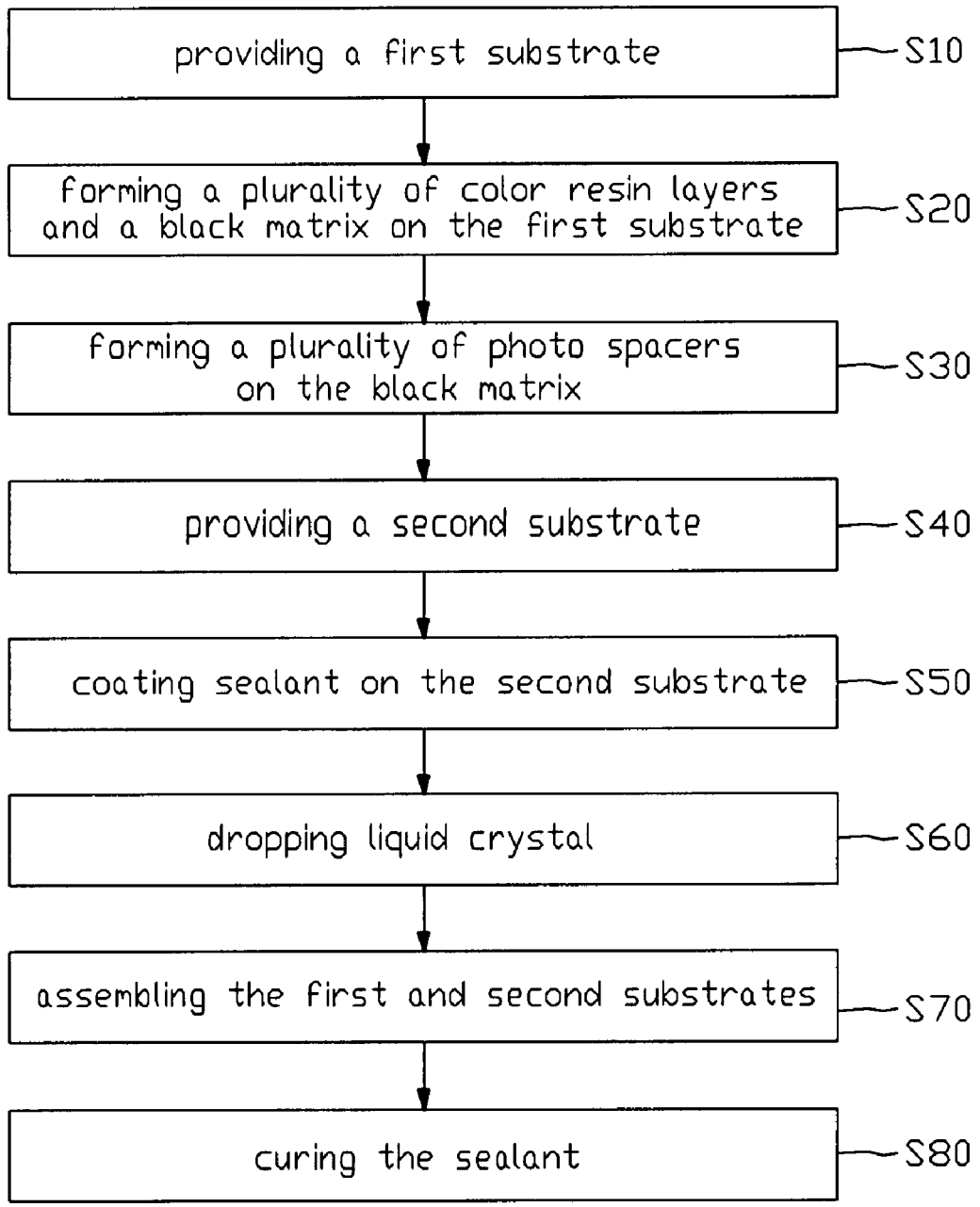
FIG. 1 is a flowchart summarizing a method for fabricating a liquid crystal panel according to a first embodiment of the present invention.

Referring to FIG. 1, this is a flowchart summarizing a method for fabricating a liquid crystal panel according to a first embodiment of the present invention. The method includes the following steps.

Figure 2:
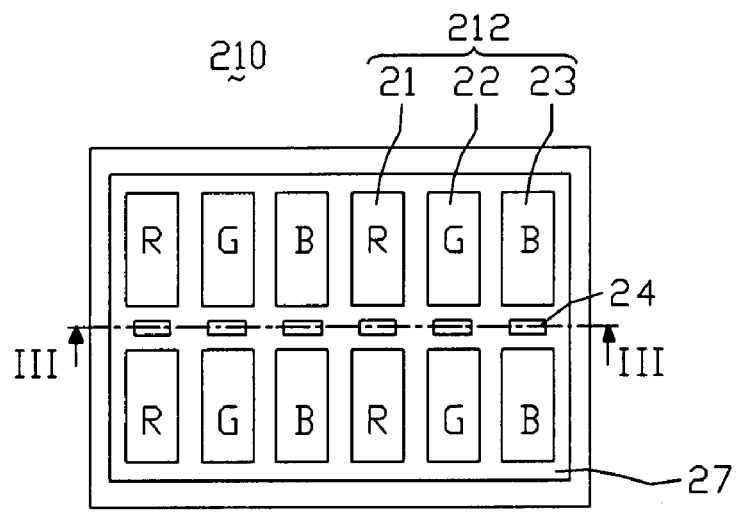
FIG. 2 is a simplified, plan view relating to steps of providing a first substrate, and forming a plurality of color resin layers, a black matrix and a plurality of photo spacers on the first substrate according to the method of FIG. 1.

In step S10, referring also to FIG. 2, a first substrate 210 is provided.

In step S20, a plurality of color resin layers 212 and a black matrix 27 spacing the color resin layers 212 are formed on the first substrate 210. The color resin layers 212 include red resin layers 21, green resin layers 22, and blue resin layers 23.

Figure 3:
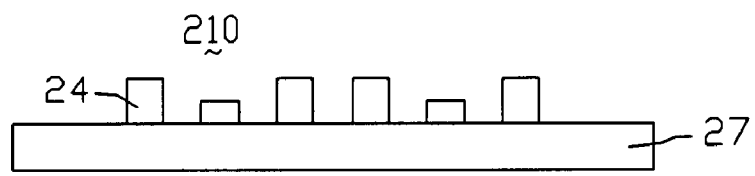
FIG. 3 is a cross-sectional view taken along line III-III of FIG. 2.

In step S30, a plurality of photo spacer 24 are formed on the black matrix 27. Each photo spacer 24 is disposed between two color resin layers 212 having a same color. Referring also to FIG. 3, a height (or length or thickness) of each of the photo spacers 24 disposed between two red resin layers 21 is equal to a height (or length or thickness) of each of the photo spacers 24 disposed between two blue resin layers 23, and is greater than a height (or length) of each of the photo spacers 24 disposed between two green resin layers 22. In one embodiment, a height difference between top surfaces of respective of the photo spacers 24 is approximately equal to 3 millimeters.

In step S40, a second substrate (not shown) is provided.

In step S50, sealant is coated along an outer periphery of the second substrate, whereby the second substrate and the frame-shaped sealant cooperatively define a space.

In step S60, liquid crystal is dropped on the second substrate in the space.

In step S70, the first substrate 210 having the color resin layers 212, the black matrix 27 and the photo spacers 24 is placed onto the second substrate and is pressed in a vacuum environment.

In step S80, ultraviolet light is used to irradiate the sealant so as to cure the sealant.

The photo spacers 24 have different heights. Therefore an initial total contact area between the photo spacers 24 and the second substrate is relatively small, because only the higher photo spacers 24 contact the second substrate. Thus when the first substrate 210 is initially pressed, only the higher photo spacers 14 are compressed, and the diminution in height of the higher photo spacers 24 is relatively great. That is, pressing of the first substrate 210 can be readily controlled. After the first substrate 210 is pressed, all the photo spacers 24 have substantially the same height. Accordingly, the liquid crystal can fill the entire space between the two substrates. This means dropping of the liquid crystal can be performed within a relatively large tolerance range. Accordingly, the method is reliable and can result in high yields.

Figure 4:
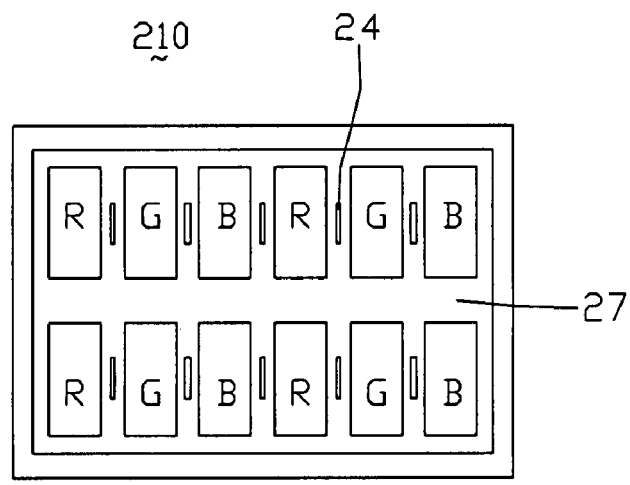
FIG. 4 is a simplified, plan view of an alternative structure of the first substrate of FIG. 2.

Referring to FIG. 4, an alternative structure of the first substrate 210 is shown. In this embodiment, each photo spacer 24 is formed between two resin layers having different colors, and at least one height difference exists between respective of the photo spacers 24.

Figure 5:
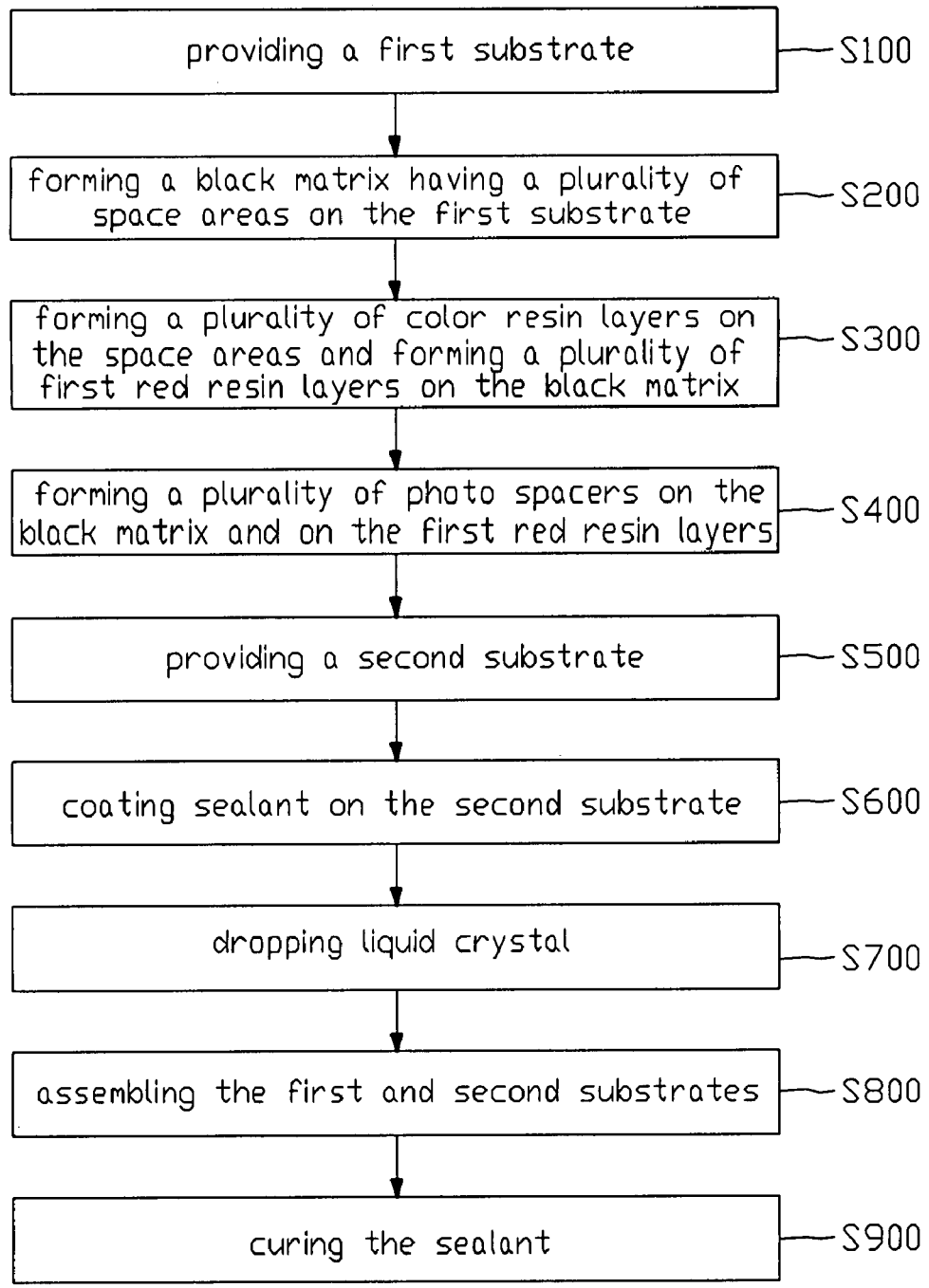
FIG. 5 is a flowchart summarizing a method for fabricating a liquid crystal panel according to a second embodiment of the present invention.

Referring to FIG. 5, this is a flowchart summarizing a method for fabricating a liquid crystal panel according to a second embodiment of the present invention. The method includes the following steps.

Figure 6:
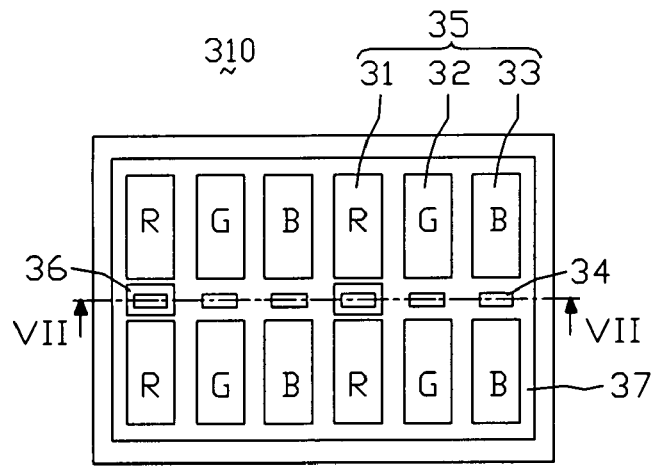
FIG. 6 is a simplified, plan view relating to steps of providing a first substrate, and forming a black matrix, a plurality of color resin layers and a plurality of photo spacers on the first substrate according to the method of FIG. 5.

In step S100, referring also to FIG. 6, a first substrate 310 is provided.

In step S200, a black matrix 37 is formed on the first substrate 310. A plurality of space areas (not labeled) are defined at the black matrix 37.

In step S300, a plurality of color resin layers 35 are formed on the space areas, and a plurality of first red resin layers 36 are formed on parts of the black matrix 37. The color resin layers 35 include second red resin layers 31, green resin layers 32, and blue resin layers 33. In one embodiment, the first red resin layers 36 have a height (or thickness) of 3 millimeters, and are each disposed between adjacent second red resin layers 31.

Figure 7:
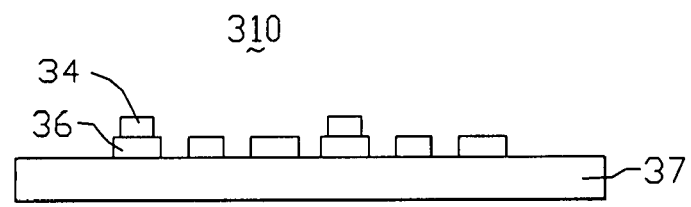
FIG. 7 is a cross-sectional view taken along line VII-VII of FIG. 6.

In step S400, referring also to FIG. 7, a plurality of photo spacers 34 are formed on the black matrix 37 and on the first red resin layers 36. In the exemplary embodiment, a height difference between top surfaces of those photo spacers 24 on the first red resin layers 36 and top surfaces of those photo spacers 24 on the black matrix 37 is approximately equal to 3 millimeters.

In step S500, a second substrate (not shown) is provided.

In step S600, sealant is coated along an outer periphery of the second substrate, whereby the second substrate and the frame-shaped sealant cooperatively define a space.

In step S700, liquid crystal is dropped on the second substrate in the space.

In step S800, the first substrate 310 having the color resin layers 35, the first red resin layers 36, the black matrix 37 and the photo spacers 34 is placed onto the second substrate and is pressed in a vacuum environment.

In step S900, ultraviolet light is used to irradiate the sealant so as to cure the sealant.

Figure 8:
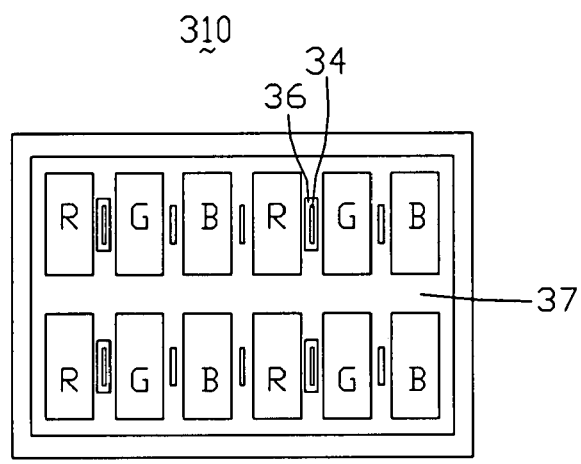
FIG. 8 is a simplified, plan view of an alternative structure of the first substrate of FIG. 6.
Figure 9:
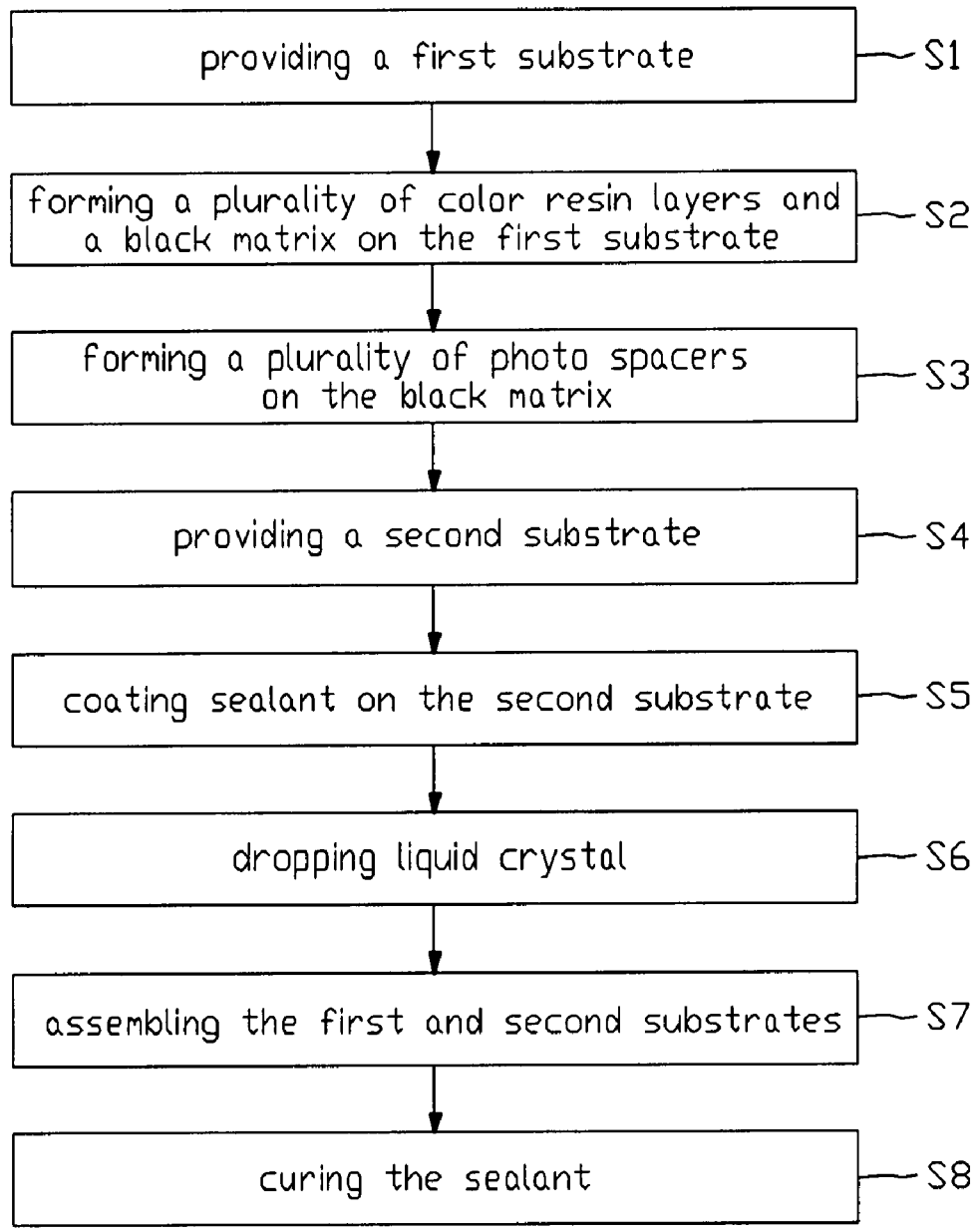
FIG. 9 is a flowchart summarizing a conventional method for fabricating a liquid crystal panel.
Figure 10:
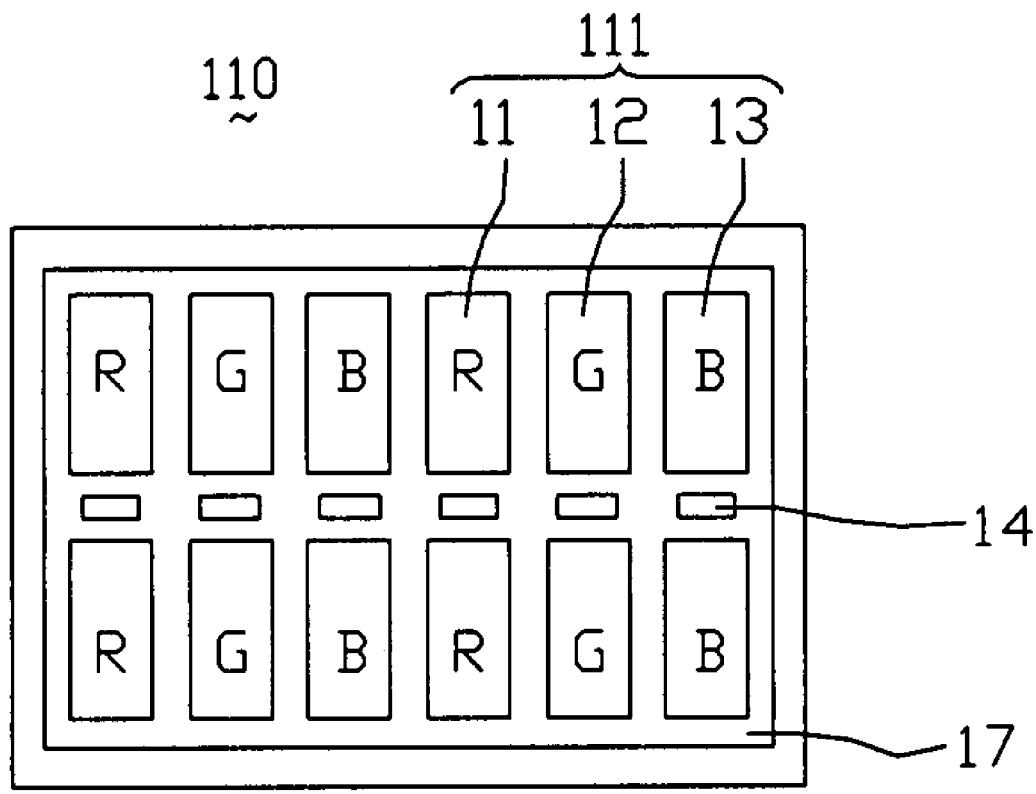
FIG. 10 is a simplified, plan view relating to steps of providing a first substrate, and forming a black matrix, a plurality of color resin layers and a plurality of photo spacers on the first substrate according to the method of FIG. 9.

Referring to FIG. 8, an alternative structure of the first substrate 310 is shown. In this embodiment, each of the first red resin layers 36 is disposed between a corresponding one of the second red resin layers 31 and an adjacent one of the other color resin layers 35 having a different color. In the illustrated embodiment, the adjacent other color resin layer 35 is a green resin layer 32.

In alternative embodiments, a height difference between top surfaces of respective of the photo spacers can for example be 0.2 millimeters, 5 millimeters, or any suitable value in the range from 0.2~5 millimeters.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for fabricating a liquid crystal panel, the method comprising:

providing a first substrate;

forming a black matrix on the first substrate, a plurality of space areas being defined at the black matrix;

forming a plurality of color resin layers on the space areas and on parts of the black matrix;

forming a plurality of compressible first photo spacers on the black matrix and a plurality of compressible second photo spacers on the color resin layers that are formed on the black matrix, wherein a combined dimension of each of the second photo spacers and the corresponding color resin layer is greater than a corresponding length of each of the first photo spacers, the combined dimension of each of the second photo spacers and the corresponding color resin layer and the corresponding length of each of the first photo spacers being measured perpendicular to the first substrate;

providing a second substrate;

coating sealant on a periphery of the second substrate, whereby the second substrate and the sealant cooperatively define a space;

dropping liquid crystal on the second substrate in the space;

placing the first substrate on the second substrate and pressing the first substrate, wherein a resulting reduction in the length of at least one of the second photo spacers is different from a resulting reduction in the length of at least one of the first photo spacers; and curing the sealant.

2. The method as claimed in claim 1, wherein a difference between the combined dimension of each of the second photo spacers and the corresponding color resin layer and the corresponding length of each of the first photo spacers is in the range from 0.2~5 millimeters.

3. The method as claimed in claim 2, wherein the difference between the combined dimension of each of the second photo spacers and the corresponding color resin layer and the corresponding length of each of the first photo spacers is equal to approximately 3 millimeters.

4. The method as claimed in claim 1, wherein the first photo spacers and the second photo spacers have the same length.

5. The method as claimed in claim 1, wherein the color resin layers comprise red resin layers, green resin layers, and blue resin layers.

6. The method as claimed in claim 1, wherein each of the second photo spacers is disposed between two adjacent color resin layers in the space areas having a same color.

7. The method as claimed in claim 1, wherein each of the second photo spacers is disposed between two color resin layers in the space areas having different colors.

8. The method as claimed in claim 1, wherein curing the sealant comprises using ultraviolet light to irradiate the sealant.

\* \* \* \* \*